United States Patent
Covell et al.

(10) Patent No.: US 11,650,720 B2
(45) Date of Patent: May 16, 2023

(54) DYNAMICALLY ADJUSTING ZOOM SETTINGS BY A SERVER IN MULTIPLE USER ENVIRONMENTS

(71) Applicant: International Business Machines Corporation, Armonk, NY (US)

(72) Inventors: Jacob Thomas Covell, New York, NY (US); Pranav Chunduri, Cary, NC (US); Spencer Sturton, Ossining, NY (US); Clarissa Ho, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 245 days.

(21) Appl. No.: 17/064,488

(22) Filed: Oct. 6, 2020

(65) Prior Publication Data

US 2022/0107713 A1 Apr. 7, 2022

(51) Int. Cl.
*G06F 3/0484* (2022.01)
*H04L 67/306* (2022.01)

(52) U.S. Cl.
CPC .......... *G06F 3/0484* (2013.01); *H04L 67/306* (2013.01); *G06F 2203/04806* (2013.01)

(58) Field of Classification Search
CPC ......... G06F 3/0484; G06F 2203/04806; H04L 67/306
See application file for complete search history.

(56) References Cited

U.S. PATENT DOCUMENTS 7,551,187 B2 6/2009 Agrawala
8,209,635 B2 6/2012 Thöm
8,578,292 B2 11/2013 Lang
8,812,978 B2 8/2014 Eschbach
9,442,649 B2 9/2016 Davis
9,582,851 B2 2/2017 Raman
(Continued)

FOREIGN PATENT DOCUMENTS

CN 103049167 A 12/2016

OTHER PUBLICATIONS

Mell et al., "The NIST Definition of Cloud Computing", National Institute of Standards and Technology, Special Publication 800-145, Sep. 2011, 7 pages.

*Primary Examiner* — Kyle R Stork
(74) *Attorney, Agent, or Firm* — Edward P. Li

(57) ABSTRACT

A computer-implemented method, a computer program product, and a computer system for dynamically adjusting zoom settings in a multiple user environment. A server determines whether the multiple user environment is an environment of co-located users or an environment of distributed users. In response to determining the environment of the co-located users, the server determines an aggregated preference, determines an optimal zoom setting for a singular display based on the aggregated preference, and adjusts the singular display based on the optimal zoom setting for the singular display. In response to determining the environment of the distributed users, the server determines optimal zoom settings for respective ones of the multiple displays, based on preferences of respective ones of the distributed users, and the server adjusts the respective ones of the multiple displays, based on the optimal zoom settings for the respective ones of the multiple displays.

17 Claims, 7 Drawing Sheets

(56) References Cited

U.S. PATENT DOCUMENTS

| | | |
|---|---|---|
| 9,691,130 B2 | 6/2017 | Plagemann |
| 2003/0234799 A1 | 12/2003 | Lee |
| 2005/0108642 A1* | 5/2005 | Sinclair, II .......... G06F 9/44505 |
| | | 715/700 |
| 2009/0141147 A1 | 6/2009 | Alberts |
| 2010/0275134 A1* | 10/2010 | Baker .................... H04N 7/147 |
| | | 715/753 |
| 2012/0287163 A1 | 11/2012 | Djavaherian |
| 2014/0331265 A1* | 11/2014 | Mozell ................. H04N 21/254 |
| | | 725/93 |
| 2016/0139575 A1* | 5/2016 | Funes .................... G06N 5/047 |
| | | 700/275 |

\* cited by examiner

DYNAMICALLY ADJUSTING ZOOM SETTINGS BY A SERVER IN MULTIPLE USER ENVIRONMENTS

BACKGROUND

The present invention relates generally to zoom settings of displays in editing and viewing documents on devices, and more particularly to dynamically adjusting the zoom settings by a server in multiple user environments.

Recent technological advances such as interconnected devices create a favorable environment for the advent of key trends such as viewing and editing documents of different types on various devices and applications by multiple users. As multiple users can access the document using device types and applications of different interfaces, screen resolutions, display sizes, etc., the multiple users desire the appropriate zoom factor for optimized user experience.

The culmination of such trends has led to an inefficient and cumbersome experience for users viewing and editing documents, especially in multiple user scenarios, as users waste a significant amount of time trying to identify the optimal zoom level for the given conditions of the working session. The continuation of these trends mean that users will look to different solutions that help streamline and optimize the viewing experience.

Current solutions in the market include simple features such as preset zoom settings that often require additional user inputs and interactions to adjust to the optimal zoom levels. Not only are these features outdated, they also lead to cost and time inefficiencies due to the multiple transmissions that need to take place before reaching the optimum. Thus, there is a gap in the market for a solution that automatically and dynamically adjusts this process. The proposed solution in this disclosure signifies the evolution of the standard document viewing experience.

SUMMARY

In one aspect, a computer-implemented method for dynamically adjusting zoom settings in a multiple user environment is provided. The computer-implemented method is implemented by a server. The computer-implemented method includes determining whether the multiple user environment in a viewing session is an environment of co-located users or an environment of distributed users, wherein the co-located users view a singular display and the distributed users view respective ones of multiple displays. The computer-implemented method further includes, in response to the environment of the co-located users, aggregating preferences of respective ones of the co-located users to determine an aggregated preference; determining an optimal zoom setting for the singular display, based on the aggregated preference; and adjusting the singular display, based on the optimal zoom setting for the singular display. The computer-implemented method further includes, in response to the environment of the distributed users, determining optimal zoom settings for the respective ones of the multiple displays, based on preferences of respective ones of the distributed users; and adjusting the respective ones of the multiple displays, based on the optimal zoom settings for the respective ones of the multiple displays.

In another aspect, a computer program product for dynamically adjusting zoom settings in a multiple user environment is provided. The computer program product comprises a computer readable storage medium having program instructions embodied therewith, and the program instructions are executable by one or more processors. The program instructions are executable to determine, by a server, whether the multiple user environment in a viewing session is an environment of co-located users or an environment of distributed users, wherein the co-located users view a singular display and the distributed users view respective ones of multiple displays. In response to determining the environment of the co-located users, the program instructions are executable to aggregate, by the server, preferences of respective ones of the co-located users to determine an aggregated preference; the program instructions are executable to determine, by the server, an optimal zoom setting for the singular display, based on the aggregated preference; and adjust, by the server, the singular display, based on the optimal zoom setting for the singular display. In response to determining the environment of the distributed users, the program instructions are executable to determine, by the server, optimal zoom settings for the respective ones of the multiple displays, based on preferences of respective ones of the distributed users; the program instructions are executable to adjust, by the server, the respective ones of the multiple displays, based on the optimal zoom settings for the respective ones of the multiple displays.

In yet another aspect, a computer system for dynamically adjusting zoom settings in a multiple user environment is provided. The computer system comprises one or more processors, one or more computer readable tangible storage devices, and program instructions stored on at least one of the one or more computer readable tangible storage devices for execution by at least one of the one or more processors. The program instructions are executable to determine, by a server, whether the multiple user environment in a viewing session is an environment of co-located users or an environment of distributed users, wherein the co-located users view a singular display and the distributed users view respective ones of multiple displays. In response to determining the environment of the co-located users, the program instructions are executable to: aggregate, by the server, preferences of respective ones of the co-located users to determine an aggregated preference; determine, by the server, an optimal zoom setting for the singular display, based on the aggregated preference; and adjust, by the server, the singular display, based on the optimal zoom setting for the singular display. In response to determining the environment of the distributed users, the program instructions are executable to: determine, by the server, optimal zoom settings for the respective ones of the multiple displays, based on preferences of respective ones of the distributed users; and adjust, by the server, the respective ones of the multiple displays, based on the optimal zoom settings for the respective ones of the multiple displays.

DETAILED DESCRIPTION

Embodiments of the present invention discloses an automated, learning-based system that analyzes the context of the user's working session, detects a multiple user environment, identifies types of multiple user environments (such as an environment of co-located multiple users with a singular display and an environment of distributed multiple users (or remote web-conference) with multiple displays), calculates the perceived size observed by the multiple users, and predicts and dynamically adjusts the outputted content to optimal zoom settings. The prediction and the dynamic adjustment are based on individual preferences or an aggregated user preference, minimum viewing requirements (per derived-variables of users), output device types, and distances between the multiple users and the output devices (or displays).

Figure 1:
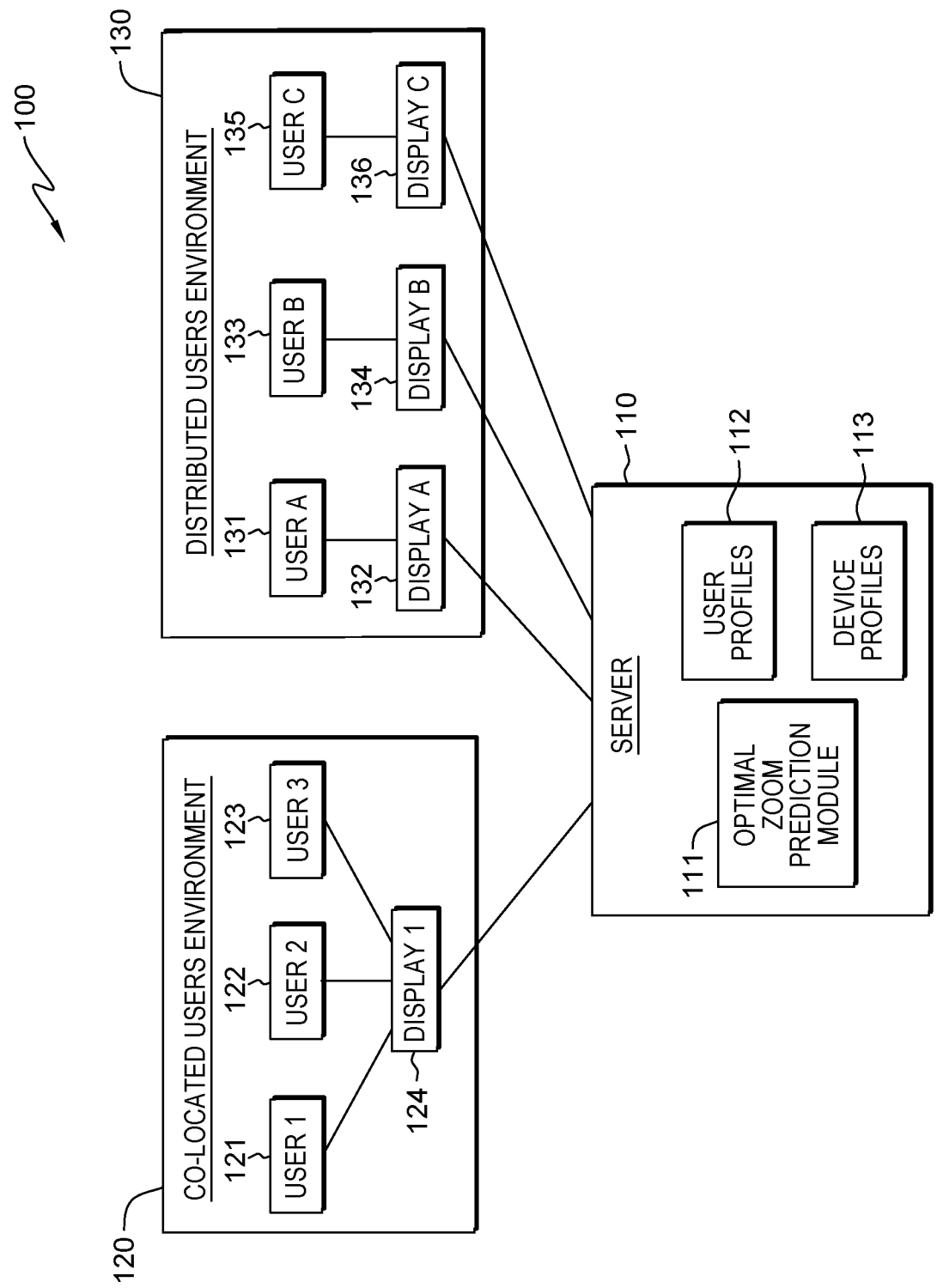
FIG. 1 is a diagram illustrating a system for dynamically adjusting zoom settings in multiple user environments, in accordance with one embodiment of the present invention.

FIG. 1 is a diagram illustrating a system 100 for dynamically adjusting zoom settings in multiple user environments, in accordance with one embodiment of the present invention. The system 100 includes a server 110 that hosts the automated, learning-based system. The server 110 includes an optimal zoom prediction module 111, user profiles 112, and device profiles 113. The optimal zoom prediction module 111 performs the functionality of dynamically adjusting zoom settings in multiple user environments. The optimal zoom prediction module 111 calculates the perceived size observed by the multiple users. The optimal zoom prediction module 111 predicts and dynamically adjusts the outputted content to optimal zoom settings. Then, the server 110 sends zoom/display adjustment parameters through an API to the user's application (which has been configured to process this information via the installed software update). The user profiles 112 is a datastore for storing preferences of users (namely, user 1 121, user 2 122, user 3 123, user A 131, user B 133, and user C 135). The device profiles 113 is a datastore for storing archives of devices. The devices are used by the user for editing and viewing documents, and the devices include, for example, personal laptops and conference room TVs.

The server 110 is hosted by one or more computer devices. A computer device is described in more detail in later paragraphs with reference to FIG. 4. In another embodiment, the server 110 may be implemented on a virtual machine or another virtualization implementation being run on a computer device. In yet another embodiment, the server 110 may be implemented in a cloud computing environment. The cloud computing environment is described in later paragraphs with reference to FIG. 5 and FIG. 6.

The system 100 includes a co-located users environment 120. The environment 120 includes co-located multiple users such as user 1 121, user 2 122, and user 3 123. The co-located multiple users view a singular display such as display 1 124. For example, display 1 124 may be a monitor screen of a computer (such as a desktop or a laptop); display 1 124 may be a conference room TV or a projector screen.

The system 100 includes a distributed users environment 130. The environment 130 includes multiple distributed users such as user A 131, user B 133, and user C 135. For example, the distributed users environment 130 may be a remote web-conference using a video-conferencing platforms (such as Skype or WebEx), in which the multiple distributed users are not co-located. Each of the multiple distributed users uses a display; for example, user A 131 uses display A 132, user B 133 uses display B 134, and user C 135 uses display C 136. Display A 132, display B 134, or display C 136 may be a monitor screen of a computer (such as a desktop or a laptop), for example.

Figure 2:
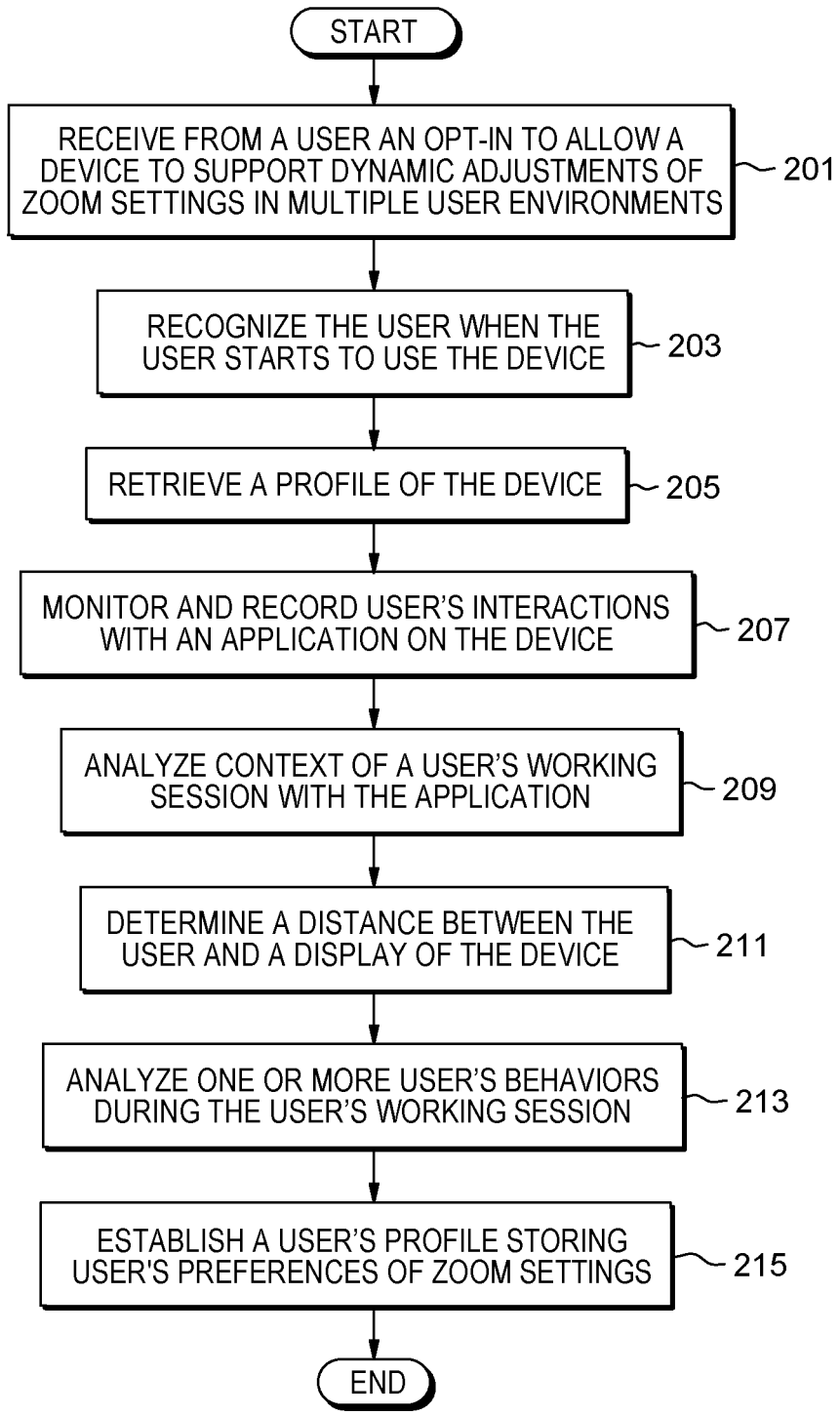
FIG. 2 presents a flowchart showing operational steps of developing a user's profile storing user's preferences of zoom settings, in accordance with one embodiment of the present invention.

FIG. 2 presents a flowchart showing operational steps of developing a user's profile storing user's preferences of zoom settings, in accordance with one embodiment of the present invention. The operational steps of developing a user's profile are implemented by a server such as the server 110 shown in FIG. 1.

At step 201, the server receives, from a user, an opt-in to allow a device to support dynamic adjustments zoom settings in multiple user environments. The user opts in to allow the device to support feature and/or functionality of dynamically adjusting zoom settings through use of required hardware components (such as front-facing camera and microphone on the device).

At step 203, the server recognizes the user when the user starts to use the device. For example, when the user starts to edit a document on the device, the user is recognized. The user is recognized by at least one of the following methods: user's login credentials, facial recognition from a front-facing camera of the device, behavioral biometrics, and audio voice recognition from a microphone of the device.

At step 205, the server retrieves a profile of the device. For example, the server 110 retrieves the profile of the device from the datastore (the device profiles 113 shown in FIG. 1). The server retrieves information with details of the device. The information of the device may include, but not limited to, the following: device type, screen dimensions, screen resolution, pixel density, aspect ratio, operating system, multiple user accessibility per device, file-viewing capabilities, presentation settings, system/performance requirements, and user preferences for viewing/editing/accessing particular file types on that device.

At step 207, the server monitors and records user's interactions with an application on the device. When the user begins interacting with the application on the device and viewing a file or document on the device, the server records the application being used, the document type, and output device being viewed.

At step 209, the server analyzes context of a user's working session with the application on the device. For example, the server determines whether the user is double-checking that all fields in an Excel document are populated; this user's interaction with the application requires a large field of view (FOV). In another instance, the server determines whether the user is editing complex formulas; this user's interaction with the application requires a narrower, more zoomed-in FOV so that the user can concentrate on formula syntax.

At step 211, the server determines a distance between the user and a display of the device. For example, the display may be a monitor screen of a computer (such as a desktop or a laptop) and may be a conference room TV or a projector screen. The distance between the user and the display is detected by utilizing the front-facing camera of the device, audio data from the device's microphone, and other known methodologies for detecting the distance.

At step 213, the server analyzes one or more user's behaviors during the user's working session. For example, the server determines whether the user is zooming in on certain parts of a file or document. In another instance, the server determines whether the user prefers a certain perceived font size.

At step 215, the server establishes a user's profile storing user's preferences of zoom settings. The preferences of the user include, but not limited to, user's preferences for viewing/editing/accessing particular file types on the device, display preferences (e.g., sharpness, contrast, hue, etc.), visual acuity rating (VAR) derived from user's zooming tendencies and typical perceived-size values of content displayed, and zoom preferences. For example, the VAR is defined as follows. (1) 0-30: heavily affected by near/farsightedness. For a user classified within this VAR category, the server determines the minimum viewing requirements (i.e., a specific perceived-font size threshold that the user cannot interpret beyond). (2) 30-70: average vision. (3) 70-100: above-average vision. The zoom preferences are per device, per perceived screen size, per context of viewing/working session, per multiple user presentation, and per setting.

Figure 3A:
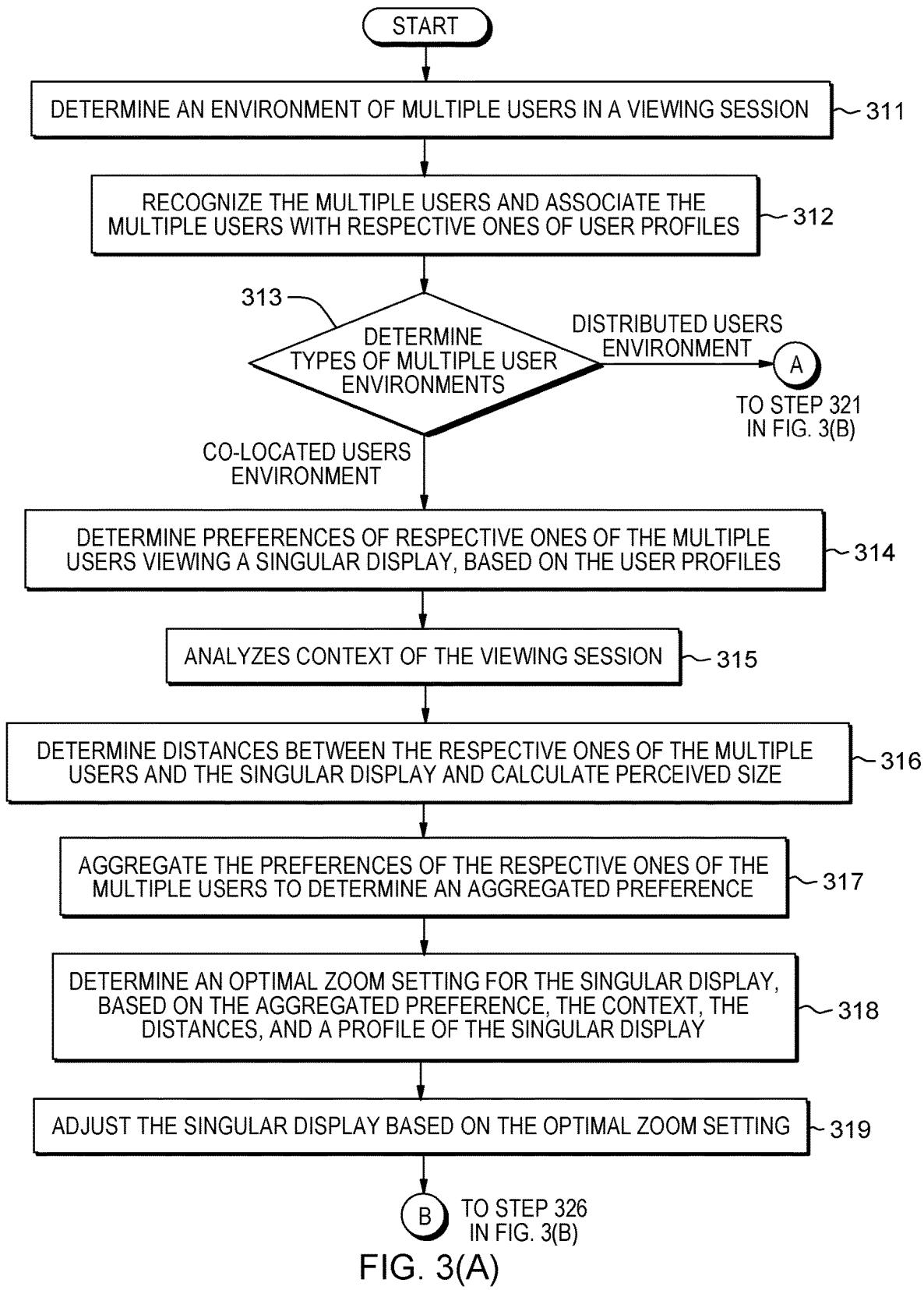
FIG. 3(A) and FIG. 3(B) present a flowchart showing operational steps of adjusting a singular display and multiple displays for multiple users, in accordance with one embodiment of the present invention.
Figure 3B:
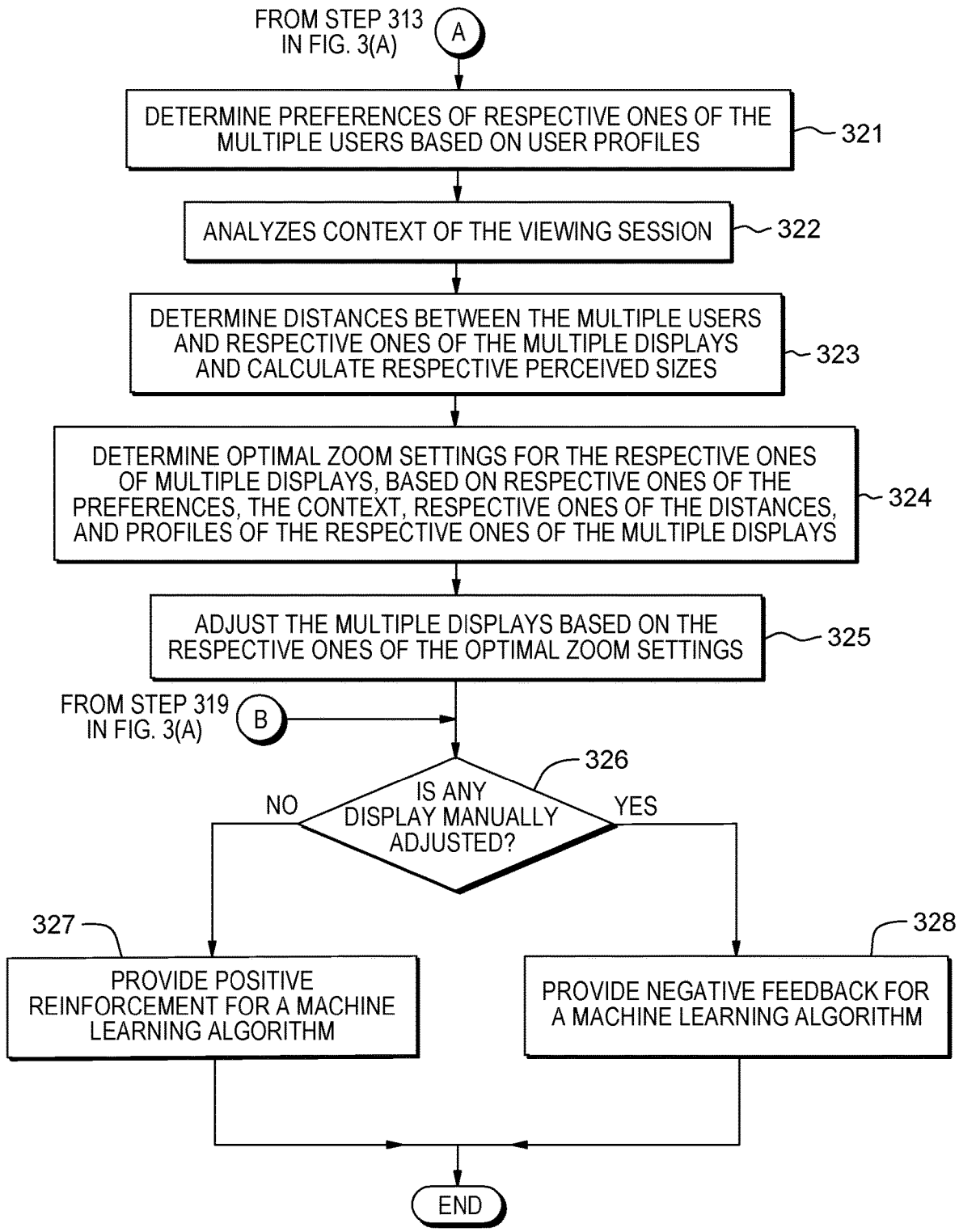

FIG. 3(A) and FIG. 3(B) present a flowchart showing operational steps of adjusting a singular display and multiple displays for multiple users, in accordance with one embodiment of the present invention. The operational steps of adjusting a singular display and multiple displays for multiple users are implemented by a server such as the server 110 shown in FIG. 1.

Referring to FIG. 3(A), at step 311, the server determines an environment of multiple users in a viewing session. The environment of multiple users may be detected by utilizing the front-facing cameras of one or more devices and/or audio data from the device's microphones. The environment of multiple users may also be detected when a group conference is started. The environment of multiple users is an environment of co-located users (e.g., the co-located users environment 120 shown in FIG. 1) or an environment of distributed users (e.g., the distributed users environment 130 shown in FIG. 1).

At step 312, the server recognizes the multiple users and associate the multiple users with respective ones of user profiles. At this step, the users are recognized by at least one of the following methods: user's login credentials, facial recognition from a front-facing camera of the device, behavioral biometrics, and audio voice recognition from a microphone of the device. Once the users are recognized, the server searches, in a datastore such as the user profiles 112 shown in FIG. 1, the user profiles of respective ones of the multiple users. Each of the user profiles is developed by using operational steps 201-215 shown in FIG. 2.

At step 313, the server determines types of environments of multiple users. The server determines whether an environment of the multiple users is an environment of the co-located users with a singular display (e.g., the co-located users environment 120 shown in FIG. 1) or an environment of distributed users (e.g., the distributed users environment 130 shown in FIG. 1). The server determines whether the multiple users are viewing the content on a singular display (such as user 1 121, user 2 122, and user 3 123 viewing the content on the display 1 124 shown in FIG. 1) or the multiple users are viewing the content on different displays (such as, as shown in FIG. 1, user A 131, user B 133, and user C 135 viewing display A 132, display B 134, and display C 136, respectively). The server determines what display or displays are used for viewing the content in the viewing session.

In response to determining the environment of the co-located users with the singular display (e.g., the co-located users environment 120 shown in FIG. 1), at step 314, the server determines preferences of respective ones of the multiple users viewing the singular display, based on the user profiles. At step 315, the server analyzes context of the viewing session, using a classification method. For example, the server determines whether the viewing session is a group presentation or the viewing session is that one or more users are viewing another user's work on the singular display.

At step 316, the server determines distances between the respective ones of the multiple users and the singular display and calculates perceived size of fonts and graphics in the content viewed in the viewing session. For example, the singular display may be a monitor screen of a computer (such as a desktop or a laptop) and may be a conference room TV or a projector screen. The distances between the respective ones of the multiple users and the singular display are detected by utilizing a front-facing camera, audio data from a microphone, and other known methodologies for detecting the distance.

At step 317, the server aggregates the preferences of the respective ones of the multiple users to determine an aggregated preference. At step 318, the server determines an optimal zoom setting for the singular display, based on the aggregated preference, the context, the distances, perceived size, and a profile of the singular display. To determine the optimal zoom setting, the server uses a neural network which incorporates insight from the aggregated preference, the context of the viewing session, the distances, the perceived size, and the profile of the singular display. Incorporating insight from the aggregated preference, the server identifies any minimum viewing requirements of users with low visual acuity rating (VAR). Incorporating insight from the context of the viewing session, the server considers large versus small field-of-view. Incorporating insight from the profile of the singular display, the server considers the screen-size and resolution of the singular display.

Based on the optimal zoom setting, at step 319, the server adjusts the singular display. The adjustment of the singular display is automatic and dynamic. Throughout the viewing session, the server monitors any change in the environment of the co-located users with the singular display. In response to the change, the server dynamically modifies the optimal zoom setting for the singular display and dynamically adjusts the singular display. After step 319, the server executes step 326 shown in FIG. 3(B). The discussion of step 326 and other steps thereafter will be given in latter paragraphs with respect to FIG. 3(B).

Now, look back decision step 313 in FIG. 3(A) and consider another decision path. In response to determining the environment of the distributed users (e.g., the distributed users environment 130 shown in FIG. 1), in which the multiple users view respective ones of the multiple displays, the server executes step 321 shown in FIG. 3(B).

Referring to FIG. 3(B), at step 321, the server determines preferences of respective ones of the multiple users, based on user profiles. At step 322, the server analyzes context of the viewing session, using a classification method.

At step 323, the server determines distances between respective ones of the multiple users and respective ones of multiple displays, and the server calculates, for each of the multiple displays, perceived size of fonts and graphics in the content viewed in the viewing session. In the example shown in FIG. 1, the server 110 determines the distance between user A 131 and display A 132, the distance between user B 133 and display B 134, and the distance between user C 135 and display C 136. A respective one of multiple displays may be a monitor screen of a computer (such as a desktop or a laptop) and may be a conference room TV or a projector screen. The distances between the respective ones of the multiple users and the respective ones of multiple displays are detected by utilizing front-facing cameras, audio data from microphones, or other known methodologies for detecting distances.

At step 324, the server determines optimal zoom settings for the respective ones of multiple displays, based on respective ones of the preferences, the context, respective ones of the distances, respective ones of the perceived sizes, and profiles of the respective ones of the multiple displays. The server determines an optimal zoom setting for an individual display, based on the preference of an individual user, the distance between an individual user and an individual display, the individually calculated perceived size, and the profile of an individual user. In the example shown in FIG. 1, the server 110 determines an optimal zoom setting of display A 132 based on the preference of user A 131, an optimal zoom setting of display B 134 based on the preference of user B 133, and an optimal zoom setting of display C 136 based on the preference of user C 135. To determine the optimal zoom setting of the individual display, the server uses a neural network which incorporates insight from the preference of the individual user, the context of the viewing session, the individual distance and the individually calculated perceived size, and the profile of the individual display. Incorporating insight from the preference of the individual user, the server identifies the minimum viewing requirement of the individual user. Incorporating insight from the profile of the individual display, the server considers the screen-size and resolution of the individual display.

At step 325, the server adjusts the multiple displays, based on the respective ones of the optimal zoom settings. The server adjusts the respective ones of the multiple displays individually. The server adjusts an individual display based on its own optimal zoom setting. In the example shown in FIG. 1, the server 110 adjusts display A 132 based on an optimal zoom setting for display A 132, adjusts display B 134 based on an optimal zoom setting for display B 134, and adjusts display C 136 based on an optimal zoom setting for display C 136. The adjustment of the individual display is automatic and dynamic. Throughout the viewing session, the server monitors any change in the environment of the distributed users. In response to the change, the server dynamically modifies the optimal zoom setting of the individual display and dynamically adjusts the individual display.

Continuously referring to FIG. 3(B), after step 319 (shown in FIG. 3(A)) and step 325, the server determines whether any display is manually adjusted after automatic adjustment has been made by the server. In response to determining a display is not manually adjusted (NO branch of step 319), at step 327, the server provides positive reinforcement for a machine learning algorithm. The information of positive reinforcement is used by the machine learning algorithm to further determine the preferences and develop the user profiles.

In response to determining a display is manually adjusted (YES branch of step 319), at step 328, the server provides negative reinforcement for a machine learning algorithm. At this step, the server records remediation steps made by any user manually adjusting the zoom setting. The server analyzes attributes of the manually-adjusted zoom setting, compares the content of the screen before and after the manually-adjusted zoom setting is executed, and the server discovers any conditions that have initially been overlooked by an optimal zoom prediction module (for example, the optimal zoom prediction module 111 shown in FIG. 1) of the server. The information of negative feedback is used by the machine learning algorithm to further determine the preferences and develop the user profiles.

Figure 4:
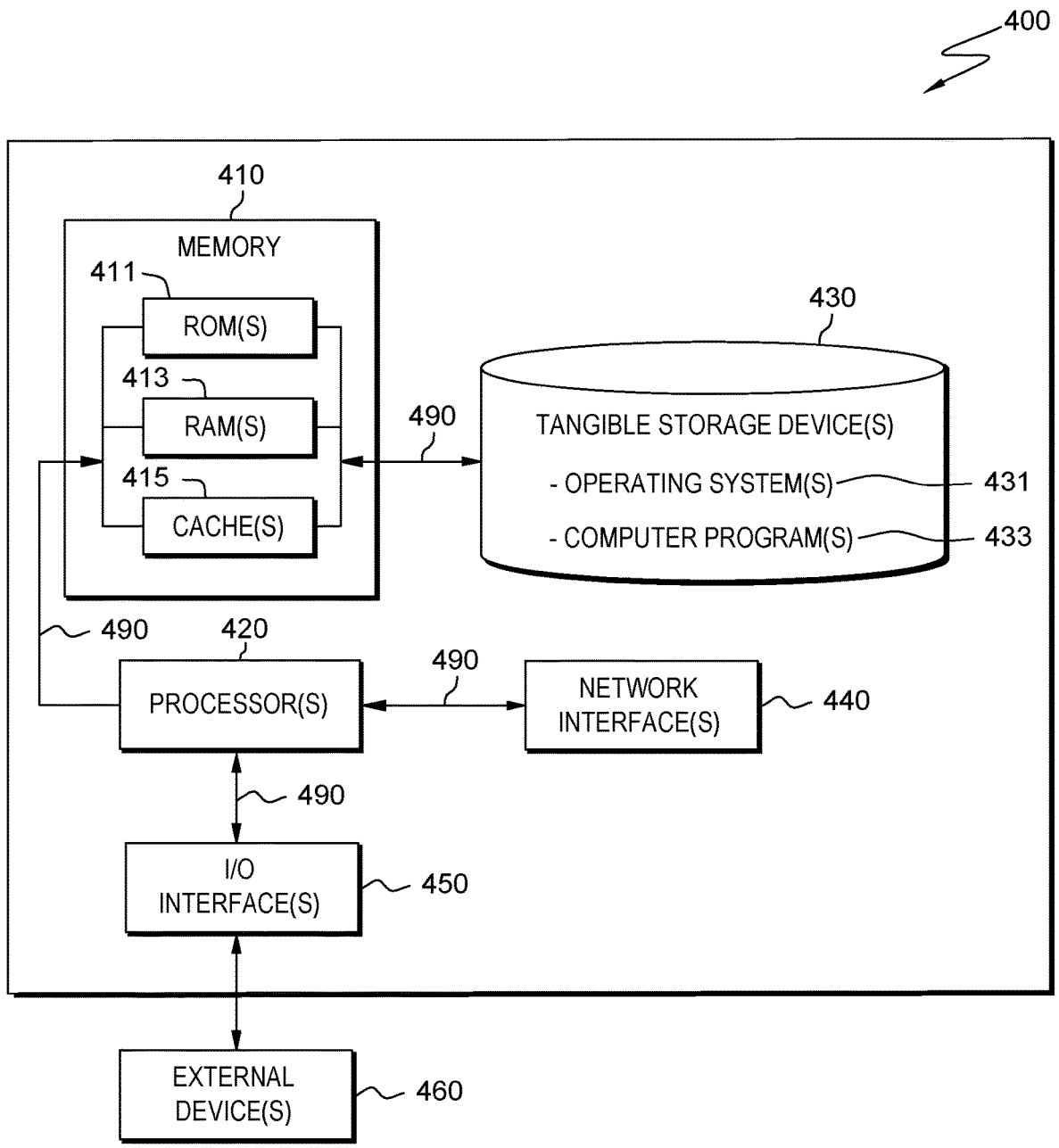
FIG. 4 is a diagram illustrating components of a computing device, in accordance with one embodiment of the present invention.

FIG. 4 is a diagram illustrating components of a computing device, in accordance with one embodiment of the present invention. It should be appreciated that FIG. 4 provides only an illustration of one implementation and does not imply any limitations with regard to the environment in which different embodiments may be implemented.

Referring to FIG. 4, computing device 400 includes processor(s) 420, memory 410, and tangible storage device(s) 430. In FIG. 4, communications among the above-mentioned components of computing device 400 are denoted by numeral 490. Memory 410 includes ROM(s) (Read Only Memory) 411, RAM(s) (Random Access Memory) 413, and cache(s) 415. One or more operating systems 431 and one or more computer programs 433 reside on one or more computer readable tangible storage device(s) 430.

Computing device 400 further includes I/O interface(s) 450. I/O interface(s) 450 allows for input and output of data with external device(s) 460 that may be connected to computing device 400. Computing device 400 further includes network interface(s) 440 for communications between computing device 400 and a computer network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
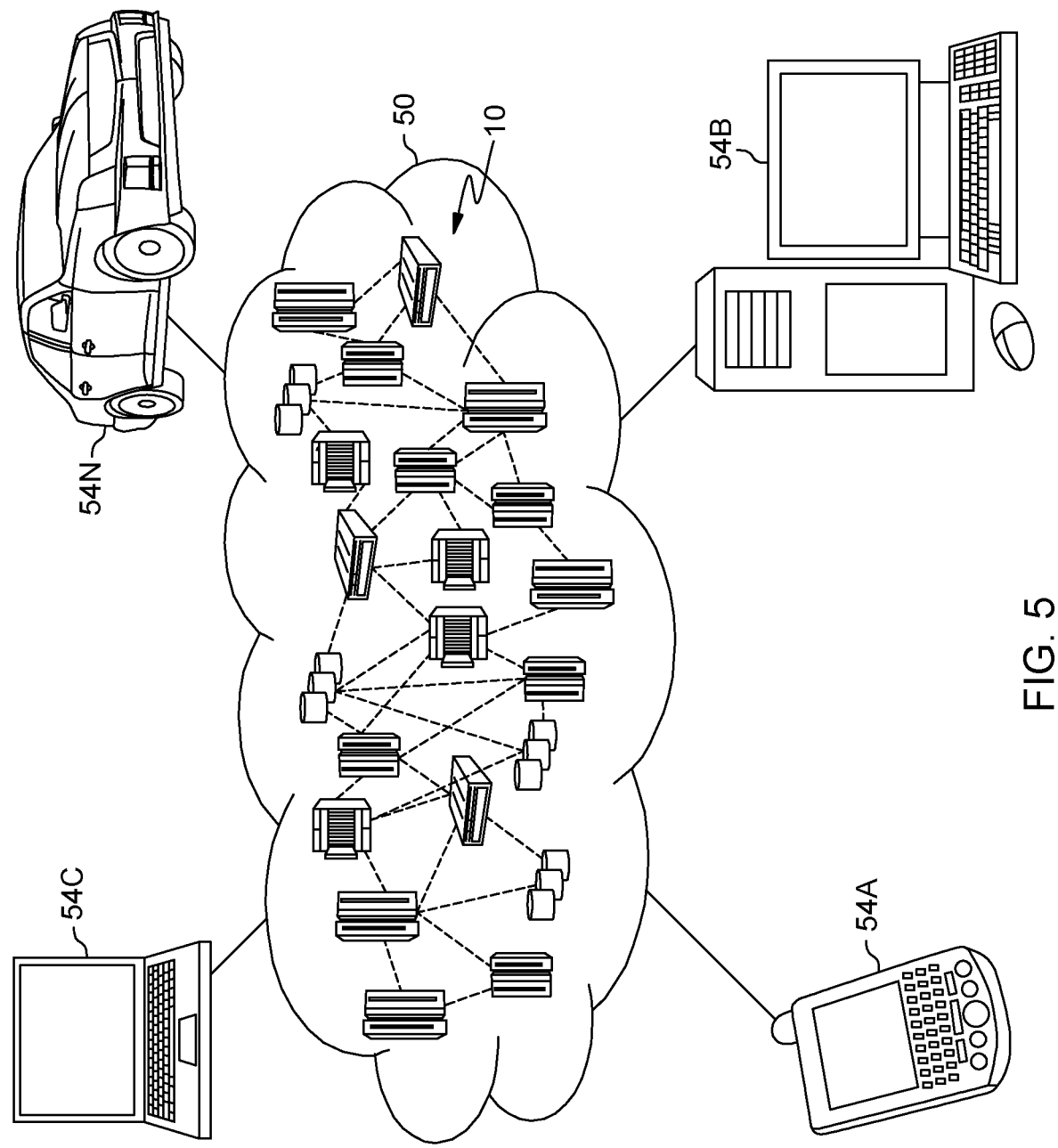
FIG. 5 depicts a cloud computing environment, in accordance with one embodiment of the present invention.

Referring now to FIG. 5, illustrative cloud computing environment 50 is depicted. As shown, cloud computing environment 50 includes one or more cloud computing nodes 10 with which local computing devices are used by cloud consumers, such as mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N are intended to be illustrative only and that computing nodes 10 and cloud computing environment 50 can communicate with any type of computerized device over any type of network and/or network addressable connection (e.g., using a web browser).

Figure 6:
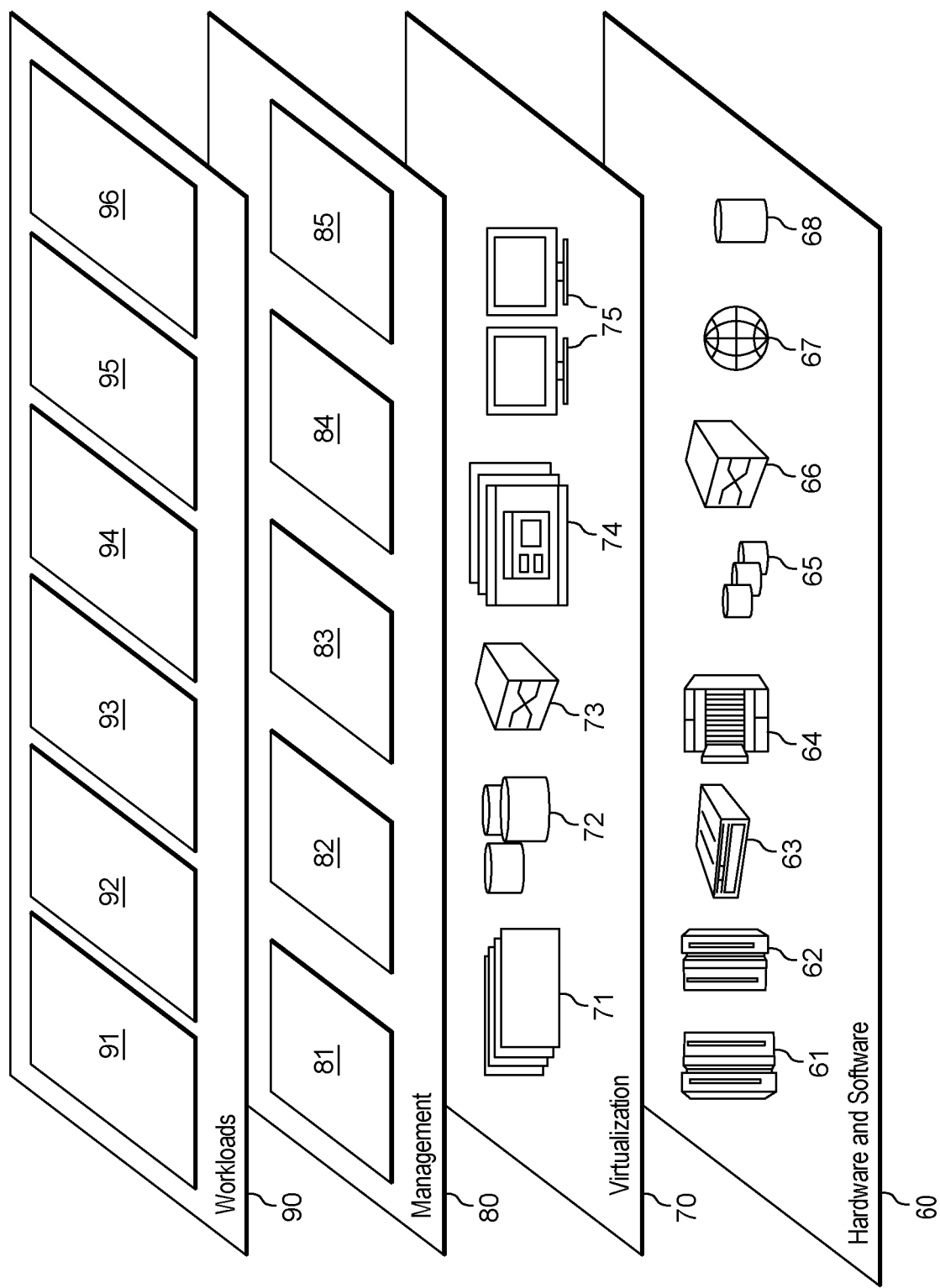
FIG. 6 depicts abstraction model layers in a cloud computing environment, in accordance with one embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and function 96. Function 96 in the present invention is the functionality of dynamically adjusting the zoom settings in multiple user environments.

What is claimed is:

1. A computer-implemented method for dynamically adjusting zoom settings in a multiple user environment, the method comprising:
   determining, by a server, whether the multiple user environment in a viewing session is an environment of co-located users or an environment of distributed users, wherein the co-located users view a singular display, wherein the distributed users view respective ones of multiple displays;

in response to determining the environment of the co-located users, determining, by the server, preferences of respective ones of the co-located users, based on respective ones of user profiles;

aggregating, by the server, the preferences of the respective ones of the co-located users to determine an aggregated preference;

analyzing, by the server, context of the viewing session;

determining, by the server, distances between the respective ones of the co-located users and the singular display;

calculating, by the server, perceived sizes of the respective ones of the co-located users;

determining, by the server, an optimal zoom setting for the singular display, based on the aggregated preference, the context of the viewing session, the distances between the respective ones of the co-located users and the singular display, the perceived sizes of the respective ones of the co-located users, and a profile of the singular display;

adjusting, by the server, the singular display, based on the optimal zoom setting for the singular display;

in response to determining the environment of the distributed users, determining, by the server, optimal zoom settings for the respective ones of the multiple displays, based on preferences of respective ones of the distributed users; and adjusting, by the server, the respective ones of the multiple displays, based on the optimal zoom settings for the respective ones of the multiple displays.

2. The computer-implemented method of claim 1, further comprising:

determining, by the server, whether a respective display is manually adjusted by a user after automatic adjustment has been made by the server;

in response to determining that the respective display is not manually adjusted, providing, by the server, positive reinforcement for a machine learning algorithm of determining the preferences and developing the user profiles; and in response to determining that the respective display is manually adjusted, providing, by the server, negative feedback for the machine learning algorithm.

3. The computer-implemented method of claim 1, further comprising:

recognizing, by the server, multiple users; and associating, by the server, the multiple users with the respective ones of the user profiles.

4. The computer-implemented method of claim 3, further comprising:

in response to determining the environment of the distributed users, determining, by the server, the preferences of the respective ones of the distributed users, based on the respective ones of the user profiles;

analyzing, by the server, the context of the viewing session;

determining, by the server, distances between the respective ones of the distributed users and the respective ones of the multiple displays and calculate perceived sizes of the respective ones of the distributed users; and wherein the determining the optimal zoom settings for the respective ones of the multiple displays is further based on the context of the viewing session, the distances between the respective ones of the distributed users and the respective ones of the multiple displays, the perceived sizes of the respective ones of the distributed users, and profiles of the respective ones of the multiple displays.

5. The computer-implemented method of claim 3, wherein developing a respective one of the user profiles comprises:

receiving, by the server, from a user, an opt-in to allow a device to support dynamically adjusting zoom settings in the multiple user environment;

recognizing, by the server, the user;

retrieving, by the server, a profile of the device;

monitoring and recording, by the server, interactions of the user with an application on the device;

analyzing, by the server, context of a working session of the user with the application;

determining, by the server, a distance between the user and a display of the device;

analyzing, by the server, one or more behaviors of the user during the working session; and establishing, by the server, a user profile of the user, wherein the user profile includes preferences of the user for the zoom settings.

6. The computer-implemented method of claim 5, wherein the user profile of the user is stored in a first datastore on the server, wherein the profile of the device is stored in a second datastore on the server.

7. A computer program product for dynamically adjusting zoom settings in a multiple user environment, the computer program product comprising a computer readable storage medium having program instructions embodied therewith, the program instructions executable by one or more processors, the program instructions executable to:

determine, by a server, whether the multiple user environment in a viewing session is an environment of co-located users or an environment of distributed users, wherein the co-located users view a singular display, wherein the distributed users view respective ones of multiple displays;

in response to determining the environment of the co-located users, determine, by the server, preferences of respective ones of the co-located users, based on respective ones of user profiles;

aggregate, by the server, the preferences of the respective ones of the co-located users to determine an aggregated preference;

analyze, by the server, context of the viewing session;

determine, by the server, distances between the respective ones of the co-located users and the singular display;

calculate, by the server, perceived sizes of the respective ones of the co-located users;

determine, by the server, an optimal zoom setting for the singular display, based on the aggregated preference, the context of the viewing session, the distances between the respective ones of the co-located users and the singular display, the perceived sizes of the respective ones of the co-located users, and a profile of the singular display;

adjust, by the server, the singular display, based on the optimal zoom setting for the singular display;

in response to determining the environment of the distributed users, determine, by the server, optimal zoom settings for the respective ones of the multiple displays, based on preferences of respective ones of the distributed users; and adjust, by the server, the respective ones of the multiple displays, based on the optimal zoom settings for the respective ones of the multiple displays.

8. The computer program product of claim 7, further comprising the program instructions executable to:
determine, by the server, whether a respective display is manually adjusted by a user after automatic adjustment has been made by the server;
in response to determining that the respective display is not manually adjusted, provide, by the server, positive reinforcement for a machine learning algorithm of determining the preferences and developing the user profiles; and
in response to determining that the respective display is manually adjusted, provide, by the server, negative feedback for the machine learning algorithm.

9. The computer program product of claim 7, further comprising the program instructions executable to:
recognize, by the server, multiple users; and
associate, by the server, the multiple users with the respective ones of the user profiles.

10. The computer program product of claim 9, further comprising the program instructions executable to:
in response to determining the environment of the distributed users, determine, by the server, the preferences of the respective ones of the distributed users, based on the respective ones of the user profiles;
analyze, by the server, the context of the viewing session;
determine, by the server, distances between the respective ones of the distributed users and the respective ones of the multiple displays and calculate perceived sizes of the respective ones of the distributed users; and
wherein the determining the optimal zoom settings for the respective ones of the multiple displays is further based on the context of the viewing session, the distances between the respective ones of the distributed users and the respective ones of the multiple displays, the perceived sizes of the respective ones of the distributed users, and profiles of the respective ones of the multiple displays.

11. The computer program product of claim 9, for developing a respective one of the user profiles, further comprising program instructions executable to:
receive, by the server, from a user, an opt-in to allow a device to support dynamically adjusting zoom settings in the multiple user environment;
recognize, by the server, the user;
retrieve, by the server, a profile of the device;
monitor and record, by the server, interactions of the user with an application on the device;
analyze, by the server, context of a working session of the user with the application;
determine, by the server, a distance between the user and a display of the device;
analyze, by the server, one or more behaviors of the user during the working session; and
establish, by the server, a user profile of the user, wherein the user profile includes preferences of the user for the zoom settings.

12. The computer program product of claim 11 wherein the user profile of the user is stored in a first datastore on the server, wherein the profile of the device is stored in a second datastore on the server.

13. A computer system for dynamically adjusting zoom settings in a multiple user environment, the computer system comprising:
one or more processors, one or more computer readable tangible storage devices, and program instructions stored on at least one of the one or more computer readable tangible storage devices for execution by at least one of the one or more processors, the program instructions executable to:
determine, by a server, whether the multiple user environment in a viewing session is an environment of co-located users or an environment of distributed users, wherein the co-located users view a singular display, wherein the distributed users view respective ones of multiple displays;
in response to determining the environment of the co-located users, determine, by the server, preferences of respective ones of the co-located users, based on respective ones of user profiles;
aggregate, by the server, the preferences of the respective ones of the co-located users to determine an aggregated preference;
analyze, by the server, context of the viewing session;
determine, by the server, distances between the respective ones of the co-located users and the singular display;
calculate, by the server, perceived sizes of the respective ones of the co-located users;
determine, by the server, an optimal zoom setting for the singular display, based on the aggregated preference, the context of the viewing session, the distances between the respective ones of the co-located users and the singular display, the perceived sizes of the respective ones of the co-located users, and a profile of the singular display;
adjust, by the server, the singular display, based on the optimal zoom setting for the singular display;
in response to determining the environment of the distributed users, determine, by the server, optimal zoom settings for the respective ones of the multiple displays, based on preferences of respective ones of the distributed users; and
adjust, by the server, the respective ones of the multiple displays, based on the optimal zoom settings for the respective ones of the multiple displays.

14. The computer system of claim 13, further comprising the program instructions executable to:
determine, by the server, whether a respective display is manually adjusted by a user after automatic adjustment has been made by the server;
in response to determining that the respective display is not manually adjusted, provide, by the server, positive reinforcement for a machine learning algorithm of determining the preferences and developing the user profiles; and
in response to determining that the respective display is manually adjusted, provide, by the server, negative feedback for the machine learning algorithm.

15. The computer system of claim 13, further comprising the program instructions executable to:
recognize, by the server, multiple users; and
associate, by the server, the multiple users with the respective ones of the user profiles.

16. The computer system of claim 15, further comprising the program instructions executable to:
in response to determining the environment of the distributed users, determine, by the server, the preferences of the respective ones of the distributed users, based on the respective ones of the user profiles;

analyze, by the server, the context of the viewing session;
determine, by the server, distances between the respective ones of the distributed users and the respective ones of the multiple displays and calculate perceived sizes of the respective ones of the distributed users; and
wherein the determining the optimal zoom settings for the respective ones of the multiple displays is further based on the context of the viewing session, the distances between the respective ones of the distributed users and the respective ones of the multiple displays, the perceived sizes of the respective ones of the distributed users, and profiles of the respective ones of the multiple displays.

17. The computer system of claim 15, further comprising program instructions executable to:
receive, by the server, from a user, an opt-in to allow a device to support dynamically adjusting zoom settings in the multiple user environment;
recognize, by the server, the user;
retrieve, by the server, a profile of the device;
monitor and record, by the server, interactions of the user with an application on the device;
analyze, by the server, context of a working session of the user with the application;
determine, by the server, a distance between the user and a display of the device;
analyze, by the server, one or more behaviors of the user during the working session; and
establish, by the server, a user profile of the user, wherein the user profile includes preferences of the user for the zoom settings.

* * * * *